(12) United States Patent
Park et al.

(10) Patent No.: US 6,584,212 B1
(45) Date of Patent: Jun. 24, 2003

(54) APPARATUS FOR MOTION ESTIMATION WITH CONTROL PART IMPLEMENTED BY STATE TRANSITION DIAGRAM

(75) Inventors: Seong Mo Park, Taejon (KR); Jin Jong Cha, Taejon (KR); Han Jin Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/475,224

(22) Filed: Dec. 30, 1999

(30) Foreign Application Priority Data

Nov. 8, 1999 (KR) .............................. 99-49203

(51) Int. Cl.[7] .................................. G06K 9/00
(52) U.S. Cl. .................. 382/107; 382/236; 375/240.16; 348/699; 710/269
(58) Field of Search ..................... 375/240.16; 348/701, 348/699; 710/269; 382/107, 236, 237

(56) References Cited

U.S. PATENT DOCUMENTS 5,173,772 A * 12/1992 Choi .......................... 348/701
5,682,208 A    10/1997 Harney ...................... 348/699
5,706,059 A     1/1998 Ran et al. .................. 348/699
5,793,429 A *   8/1998 Kim et al. ............... 375/240.17
6,145,047 A * 11/2000 Garinger et al. ............ 710/260
6,335,950 B1 *  1/2002 Kohn ..................... 375/240.16

OTHER PUBLICATIONS

Dong–Ho Lee, LSI Architecture Designs of The Olock–Matching Motion Estimation/Compensation Using A Modified 4–Step Search Algorithm, Jul. 4, 1998, p. 1238–1246.

* cited by examiner

Primary Examiner—Leo Boudreau
Assistant Examiner—Tom Y Lu
(74) Attorney, Agent, or Firm—Jacobson Holman PLLC (57) ABSTRACT

An apparatus for motion estimation with control part implemented by state transition diagram without adding delay circuits to processing elements, and capable of maintaining a regular data flow and easily implementing hardware to improve a power consume and speed is disclosed. The apparatus comprises a first and second storage parts for storing data; a measurement part for finding an absolute difference between the data; a step decision part for determining a minimum value; and a control part implemented by state transition diagram.

12 Claims, 10 Drawing Sheets

APPARATUS FOR MOTION ESTIMATION WITH CONTROL PART IMPLEMENTED BY STATE TRANSITION DIAGRAM

BACKGROUND OF THE INVENTION

The present invention relates to a design of integrated circuit for implementing a compression of image data with hardware, more particularly, to an apparatus for motion estimation with control section implemented by state transition diagram.

In general, a perfect search method among the compression methods of image data has been widely used to remove time duplication. The method has an advantage of obtaining a good quality of image in decoding, while its implementation in real-time is restricted by a lots of quantity of calculations in decoding. Recently, a four-step search (hereafter, it is called as 4SS) algorithm has been developed to solve the disadvantage of the method.

The 4SS algorithm has less quantity of calculation than that of the perfect search method, while it is not proper to implement hardware because of an irregular search range in finding motion vectors each step of implementing.

A method for implementing hardware using the 4SS algorithm has been introduced, but the method has problems in view of the number of gate and a speed due to adding a delay circuit to a processing element.

Figure 1:
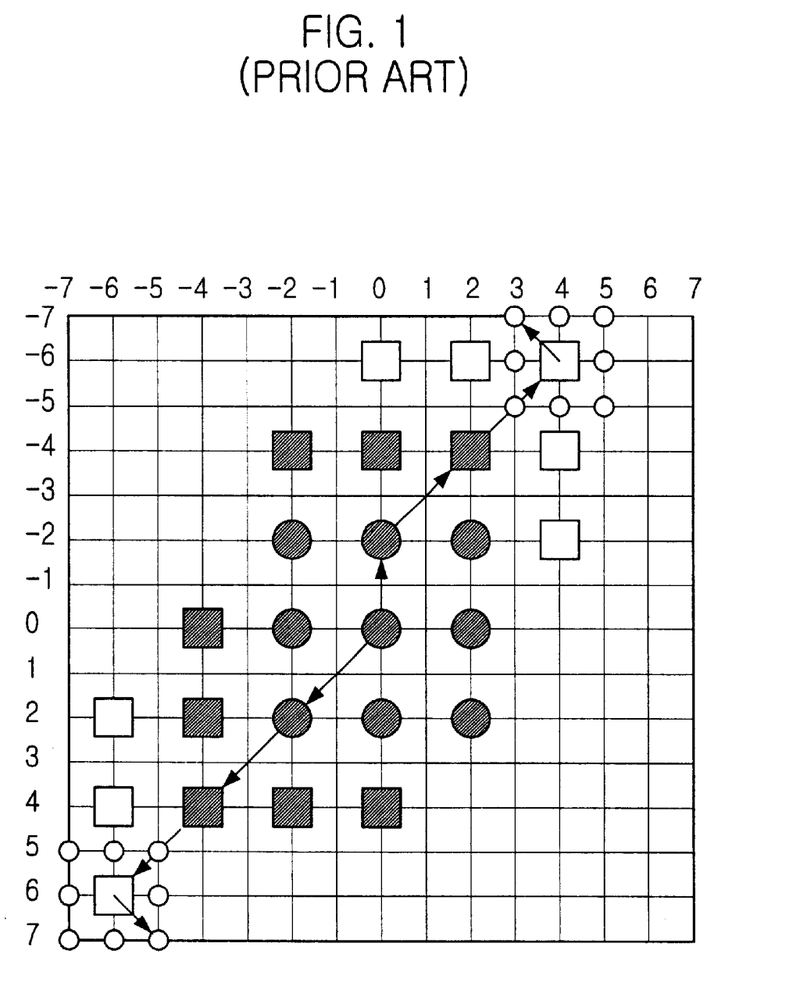
FIG. 1 is a diagram illustrating a prior four-step search (4SS) algorithm.

At first, we will describe the 4SS algorithm referring FIG. 1 and 2.

Figure 2A:
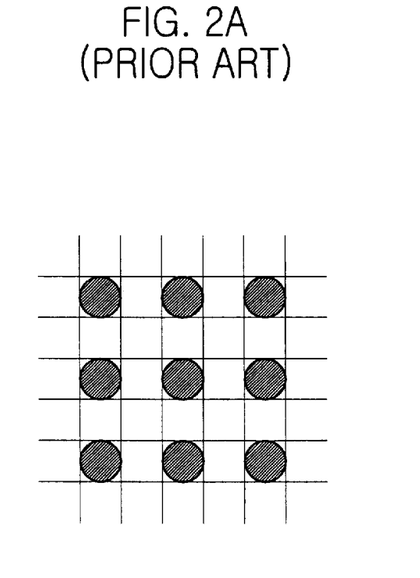
FIGS. 2A–2D are diagrams illustrating another prior 4SS algorithm.
Figure 2B:
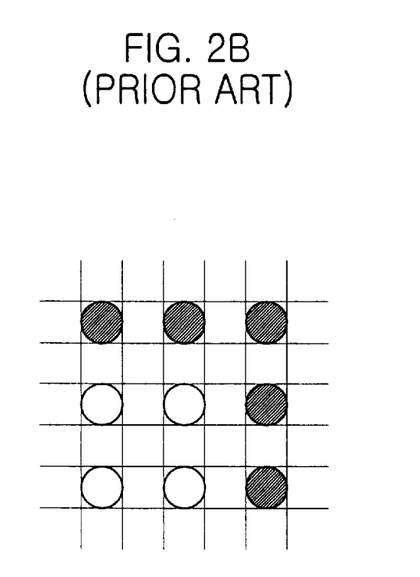
Figure 2C:
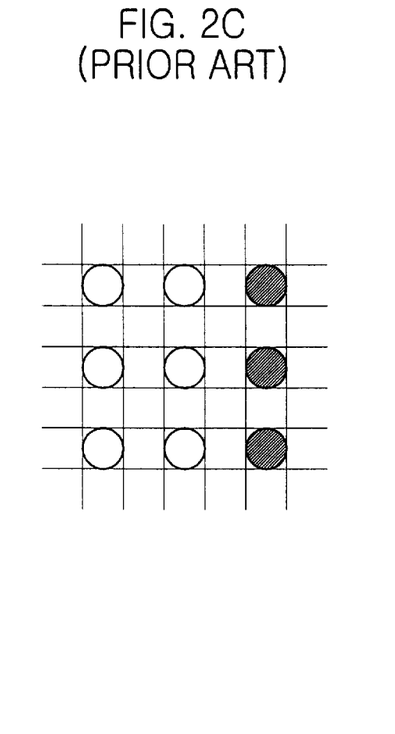
Figure 2D:
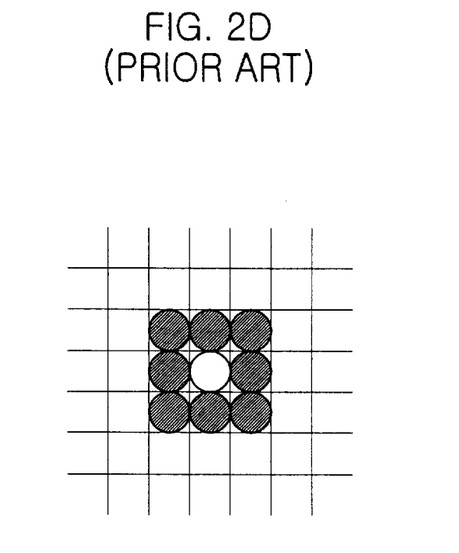

The FIGS. 1 and 2A–2D show an embodiment algorithm of a general 4SS, FIG. 1 shows two paths of the 4SS method. Also, FIG. 2A shows a first step of the 4SS, FIGS. 2B and 2C show a second or third step, FIG. 2D shows a forth step of the 4SS.

The 4SS algorithm searches nine locations in a block of 5×5 size using a centralized characteristic of a motion vector (MV).

At the next step, a center of a search block moves to a minimum block distance measure (BDM) point. At the next two steps, the sizes of search blocks are different from each other according to the minimum block distance measure (BDM) point.

If the minimum block distance measure point is found in the center of a search block, a search is performed at the last fourth step having a 3×3 size. In the other cases, the sizes of search blocks are maintained 5×5 at the second and third steps. The fourth step has a reduced block of 3×3 size.

The 4SS algorithm is like the followings.

A first step is finding a minimum block distance measure (BDM) point by searching nine locations in a search block of 5×5 size located at the center of a search window of 15×15 size. If the minimum BDM point is found at the center of the search block, the step goes to a fourth step. Otherwise, the step goes to a second step.

At a second step, the size of a search block maintains a 5×5 size, while a search method depends on the location of the minimum BDM point. At first, if the minimum BDM point locates an edge of the search block, the second step searches five locations additionally. And if the minimum BDM point locates the middle of a horizontal axis and a vertical point, the step searches three locations additionally. Then, If the minimum BDM point is found at the center of the search block, the step goes to a fourth step. Otherwise, the step goes to a third step.

A third step is performed as the second step, that is, the third step goes to a forth step, if the minimum BDM point locates the center of a search block.

At a fourth step, the size of the search block decrease 3×3. The smallest BDM point of nine locations is considered as a final MV.

If the minimum BDM point is found at the center of the search block, the intermediate steps of 4SS may be omitted or a step may directly go to the last step having the search block of 3×3 size.

The 4SS algorithm can search a block of 15×15 size using small search blocks of 3×3 size and 5×5 size. But, since both the second and third steps may search a block of 5×5 size, the two steps have a duplication search location of 5×5 block. Thus, the whole number of search locations is a minimum 17(9+8) and a maximum 27(9+5+5+8).

That is, the 4SS calculates block matching as many as 27 times, when the image has the most active motion.

FIG. 1 shows two examples of different search paths using the 4SS.

An upper path in the FIG. 1 of which search locations are 27 is used for a motion vector to estimate a location of (−7,7). At that time, the 4SS algorithm needs maximum 27 block matching operations, a 3SS algorithm needs 25 block matching operations and a N3SS algorithm needs 33 block matching operations.

Since the 3SS algorithm assumes that the possibilities of all motion vectors are equal without considering a statistical distribution of motion vectors and selects a search location, the performance of 3SS decreases. On the contrary, the 4SS selects a search location with considering the statistical generating possibilities of motion vectors, so it can find an exact motion vector by a little quantity of calculation in a less active image.

Figure 3:
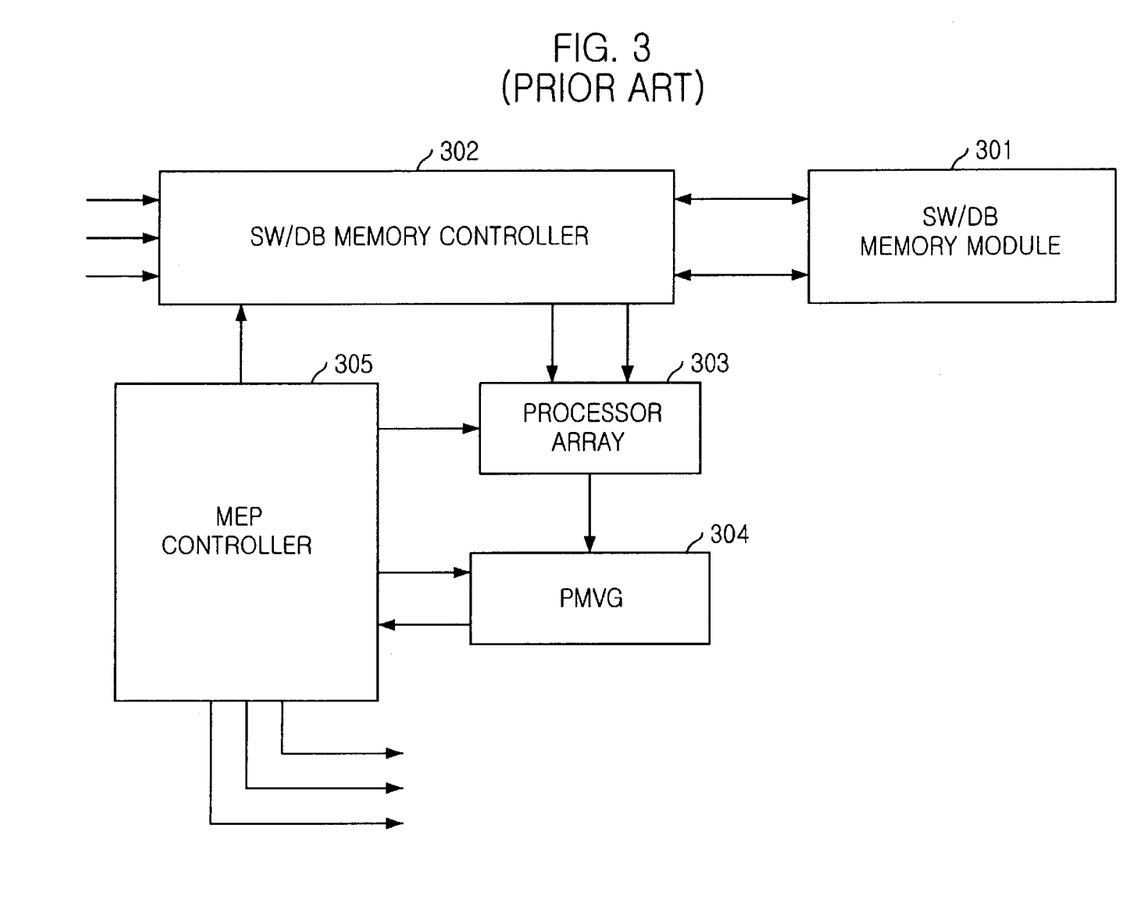
FIG. 3 is a block diagram of a prior apparatus for motion estimation.

FIG. 3 is a block diagram of an estimation part of a prior apparatus for motion estimation using a prior modified 4SS algorithm.

The estimation part consists of a SW/DB memory module 301 for storing a search window (SW) and a reference block data (DB), a SW/DB memory controller 302 for controlling the input/output of the SW and DB data into/from the SW/DB memory 301, a processor array (PE) 303 having nine processor elements for calculating the sum of absolute difference (SAD) of a basis module having nine search locations, a pre motion vector generator (PMVG) 304 for finding the minimum value among the SAD value from the processor array 303 and a motion estimation prediction (MEP) controller 305 for controlling a whole operation of the estimation part and determining a motion vector.

As input or output of the whole structure, there are a search window data input, a reference block data input, a start signal (START) of motion estimation, a sync signal (NEXT) of SW and DB data input, and the signal (BND_SIG) indicating the existence of the search window over the edge of a window.

Figure 4A:
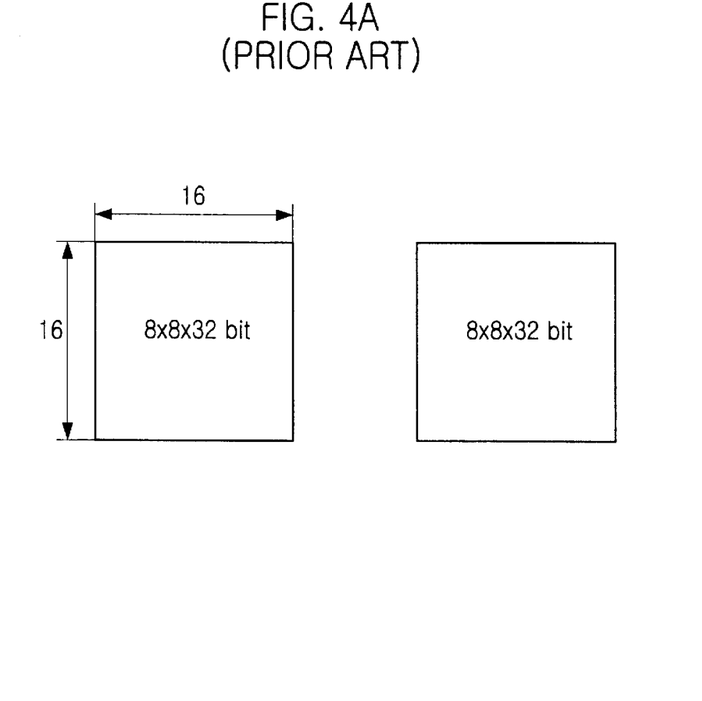
FIGS. 4A and 4B are block diagrams of a prior apparatus for motion estimation.
Figure 4B:
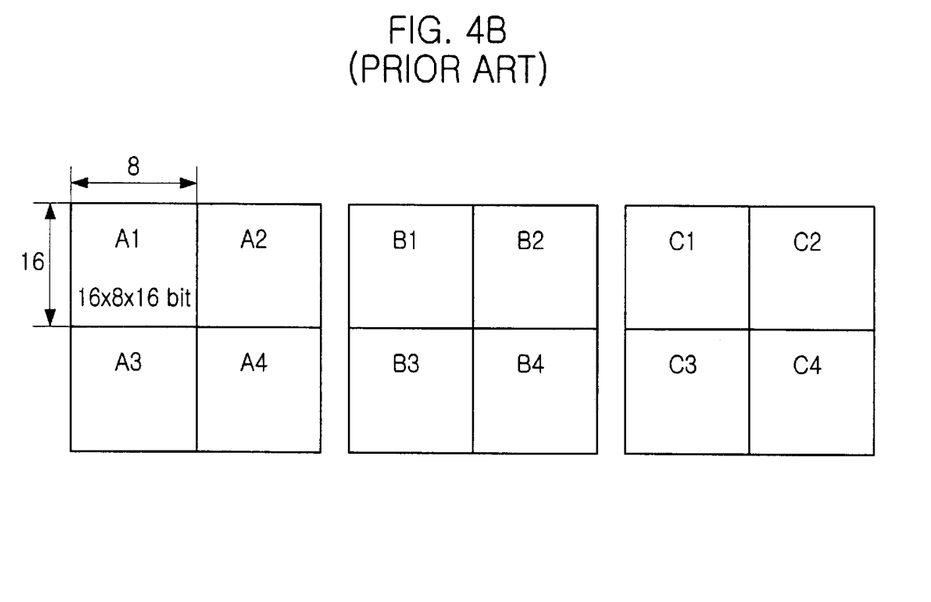

The SW and DB data are stored in the each memory according to the NEXT signal. FIGS. 4A and 4B show block diagrams of the SW/DB memory module 301.

The FIG. 4A is a block diagram of a prior DB data memory module and the FIG. 4B is a block diagram of a prior SW data memory module.

The DB data of 8 bits and SW data of 16 bits are inputted from outside and 32 bits read them out. The apparatus receives a search start location of (r0, c0) and a restart signal from the MEP controller 305 and generates the address for reading out from the memory. The search window of 18×18 data to a basis module is serially read out from the SW data of 32×32 size at the reference of the search start location of (r0, c0) with horizontal scan by the generated address.

The SW memory is consisted of 3 memories of 32×16 size. Two memories of the memories are used for estimating motion, while the other memory stores the search window of the next block. By this configuration, the apparatus can save a memory of 32×16 comparing to a general double buffer configuration.

Figure 5:
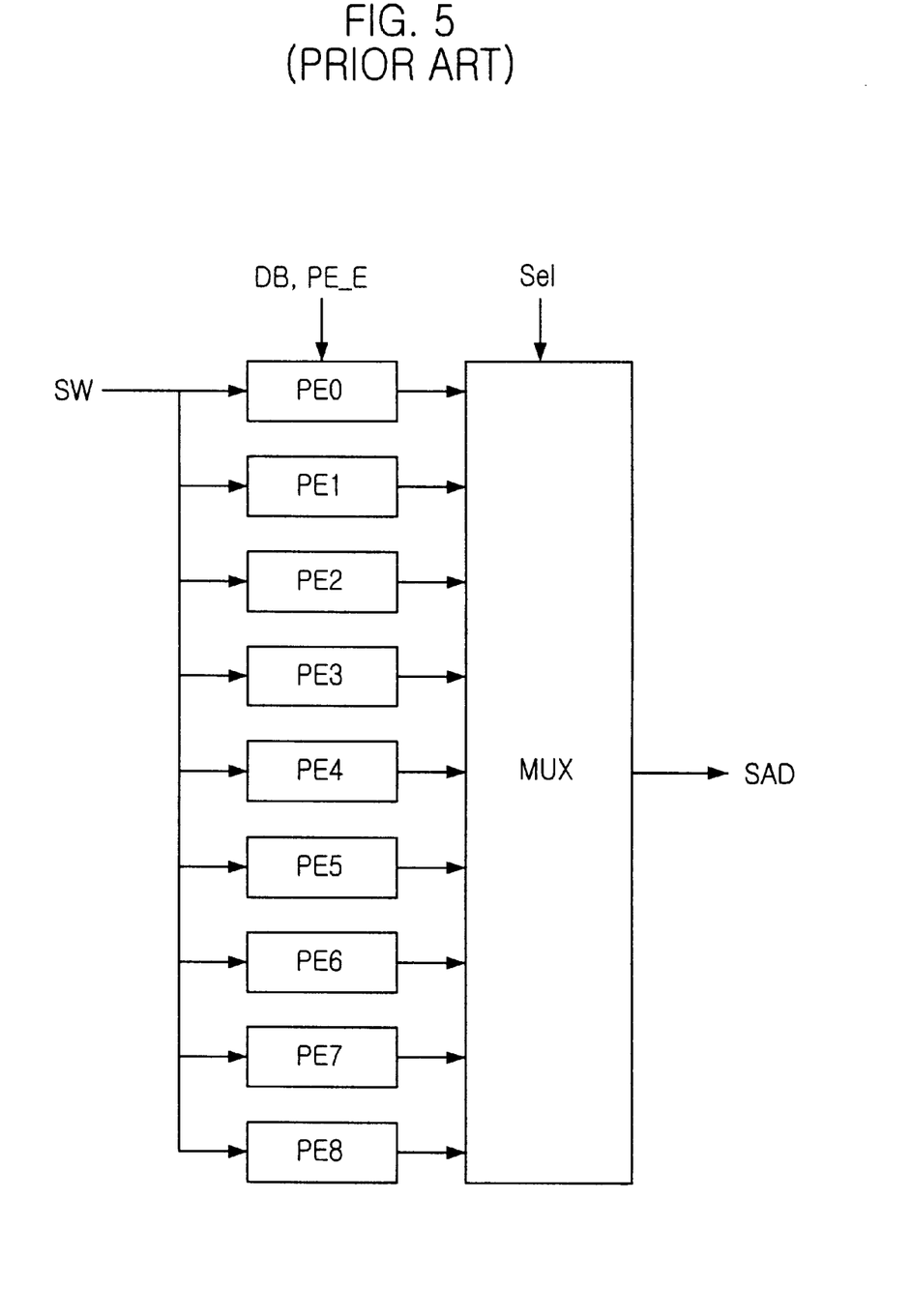
FIG. 5 is a block diagram of a prior processor array.

FIG. 5 shows a block diagram of a prior processor array 303 consisted of nine process element(PE)s.

In the FIG. 5, the delay type of each pixel is different from each other, because the operations for motion estimation are 32 bits: i.e. the four pixels are operated at the same time.

Figure 6:
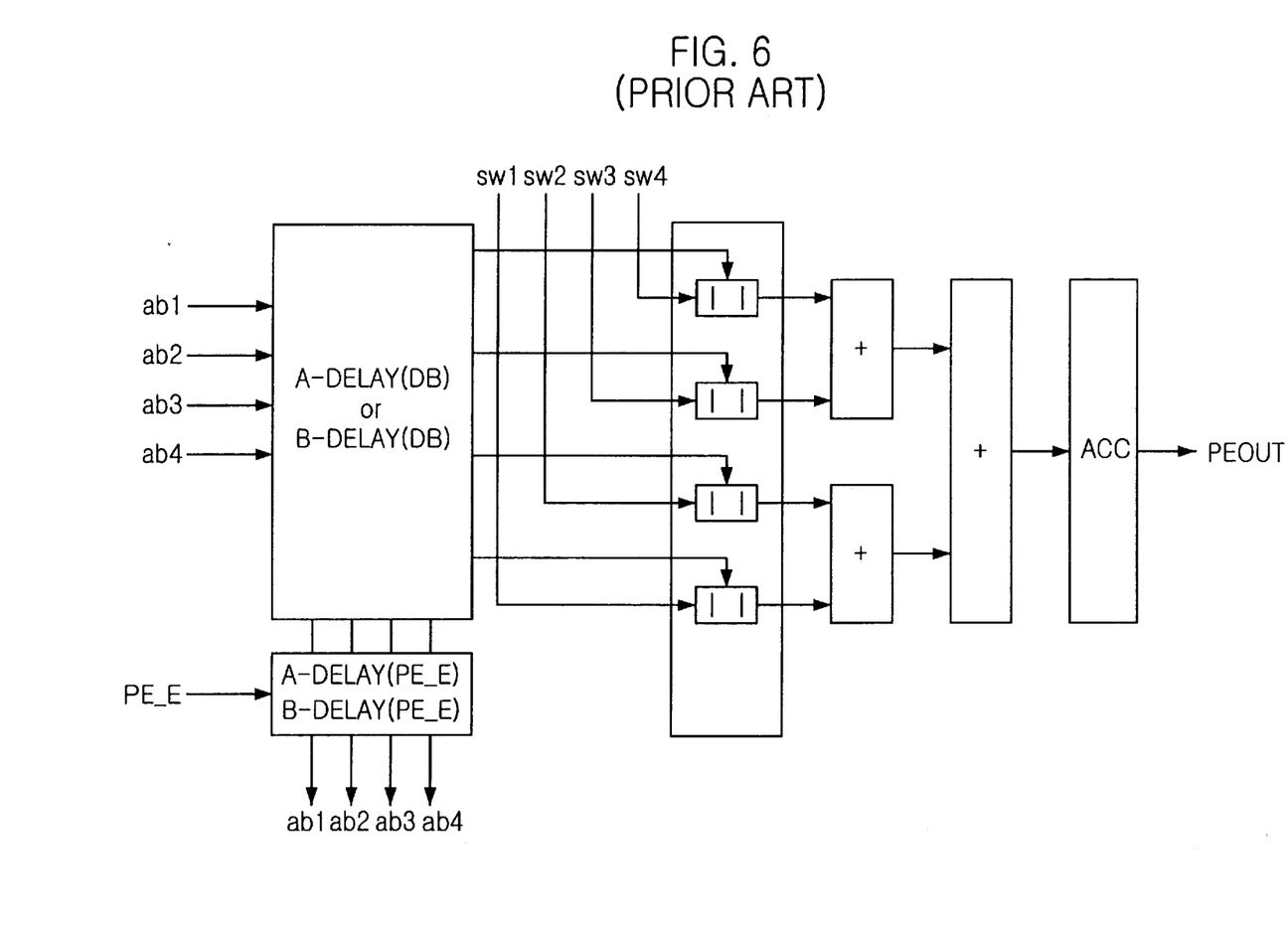
FIG. 6 is a block diagram of prior processor elements.

As described FIG. 6 being a block diagram of a prior processor elements, the configuration of the PE for the SAD operation is consisted of the delay type, a part for finding an absolute value being parallel to 4 pixels, an adder and an accumulator.

The PE1, PE2, PE4, P45, PE7, PE8 consisting the processor array 303 are a same delay type, also the PE3 and PE6 comprise a same delay type, but only the PE0 does not comprise the delay structure.

The time for outputting the SAD value from the nine PEs according to a comparison order basically requires (16× 16)/4 cycles for each block, due to simultaneously operations of 4 pixels. The delay time of DB data from PE0 to PE8 is totally 81 cycles.

The PMVG 304 compares the SAD outputs to nine search locations corresponding to a basis module of MFSS algorithm with the sync signals received from the MEP controller 305 in order. Thus, sync signals of nine are enabled to find a minimum error location among the nine search locations of the basis module. The SAD outputs are compared with the sync signals in a determined order, and the location and value to a minimum error location are outputted to the MEP controller 305.

The MEP controller 305 controls a whole operation of the motion estimation and performs the followings.

First, the MEP controller 305 generates a start signal for reading SW and DB data and a search start address of SW.

Second, it generates a signal indicating the time for finally outputting the results of nine PEs.

Third, it generates a sync signal for comparing the SAD outputs with each other to find a minimum value among the nine SAD outputs.

A motion vector is calculated by the final step of motion estimation, and then the horizontal and vertical motion vectors and sync signal are outputted. The operation control of the MEP controller 305 is done by an internal counter, particularly, is started by synchronizing with an estimation start signal and is initialized after output of a final motion vector.

A whole operation is performed followings. At first, the step counter counting steps of the modified four-step search (MFSS) is increased from 0 to 3. Then, the minimum error values of a basis module are compared each other, whenever the module counter again counting a basis module according to the step counter value is changed. And the start address of read data is outputted to the controller of SW/DB memory.

The described prior art has problems that the size of hardware is bigger by adding a delay circuit to an internal of the processing element and the controller for controlling it is more complex. Also, the speed of prior apparatus is decreased.

SUMMARY OF THE INVENTION

The object of the present invention is to provide an apparatus for motion estimation with control part implemented by state transition diagram without adding delay circuits to processing elements, and capable of maintaining a regular data flow and easily implementing hardware to improve a power consume and speed.

In accordance with the object of the present invention, there is provided an apparatus for motion estimation using search algorithm comprising: a first and second storage parts for respectively storing a previous image value and present image value; a measurement part for finding an absolute difference between the stored previous image value and the present image value; a step decision part for determining a minimum value among the output values from the measurement part; and a control part implemented by state transition diagram representing all steps of the search algorithm for controlling the search algorithm according to the decision of the step decision part.

The present invention is characteristic of improving an area, power consume and speed of hardware by implementing a processing element without additional delay circuit in implementing proper hardware for motion estimation.

BRIEF DESCRIPTION OF THE DRAWING

The object, features and advantages of the present invention are understood within the context of the description of the preferred embodiment as set forth below. The description of the preferred embodiment is understood within the context of accompanying drawing. Which form a material part of this disclosure, wherein.

DESCRIPTION OF THE PREFERRED EMBODIMENT

We will describe the preferred embodiment of the present invention referring FIGS. 7–10.

Figure 7:
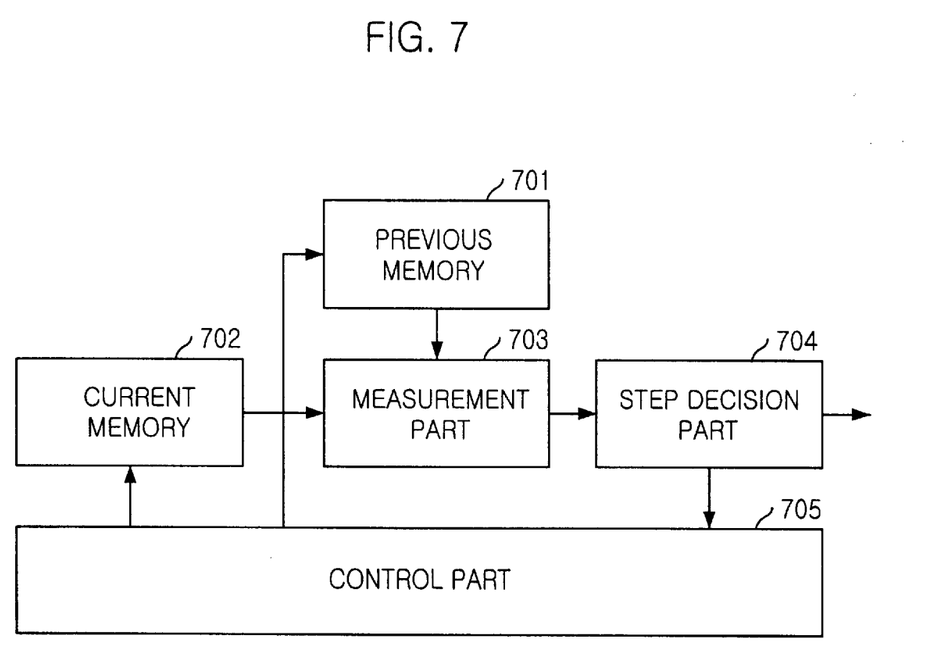
FIG. 7 is a block diagram of an apparatus for motion estimation according to the present invention.

FIG. 7 is a block diagram of an apparatus for motion estimation according to the present invention.

As described FIG. 7, the apparatus comprises a previous memory 701 for storing a previous image value, a present memory 702 for storing a present image value, a measurement part 703 consisted of processing elements for finding an absolute difference between the previous image value and the present image value, a step decision part 704 for determining a minimum value to each processing element; and a control part 705 for controlling the operations.

Figure 8:
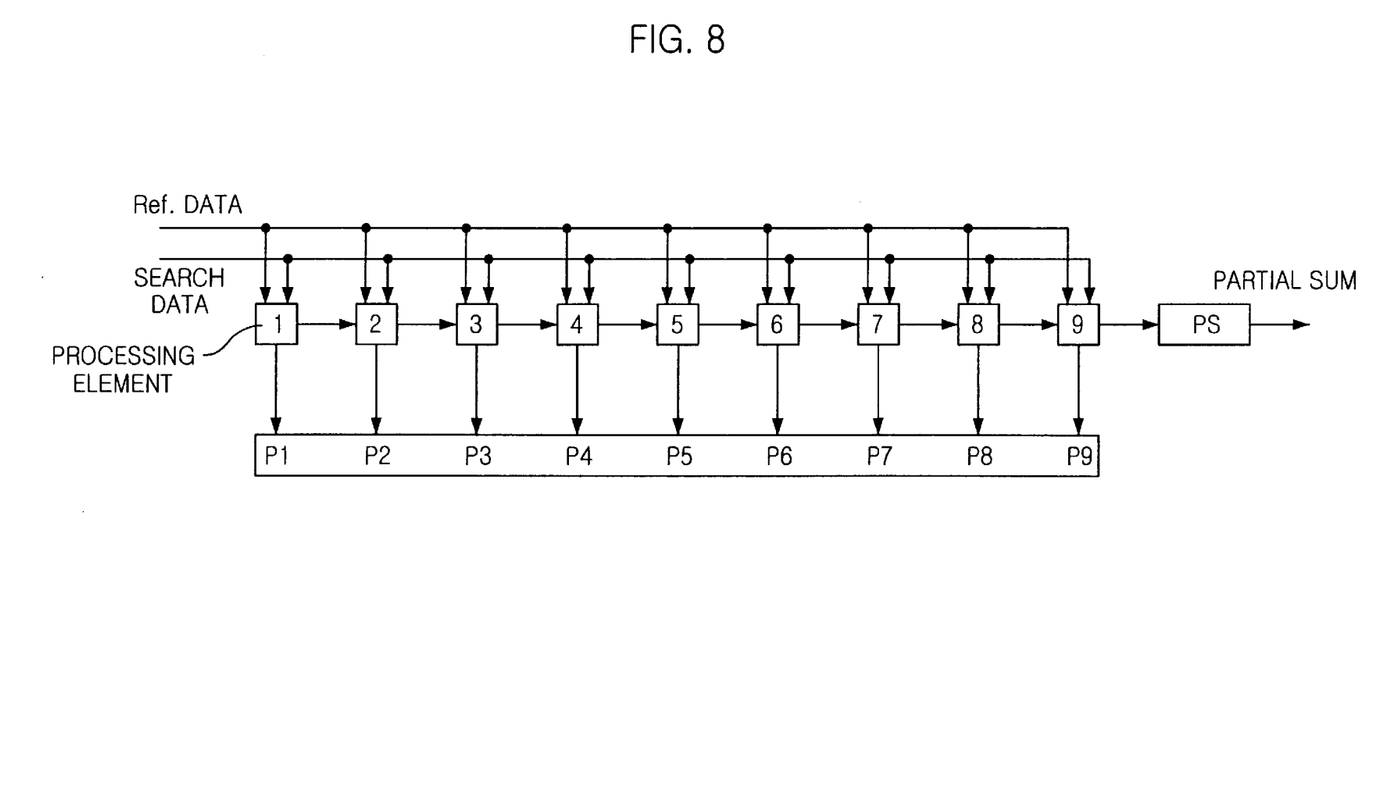
FIG. 8 is a block diagram of processing elements according to the present invention.

FIG. 8 is a detailed block diagram of the measurement part 703 of FIG. 7.

The measurement part 703 comprises nine processing elements. The nine processing elements respectively receive two inputs of previous image data and present image data and find an absolute difference between two data. Then each processing element outputs the absolute difference to the step decision part 704, at the same time, it outputs the absolute difference to a next processing element to find a partial sum.

Figure 9:
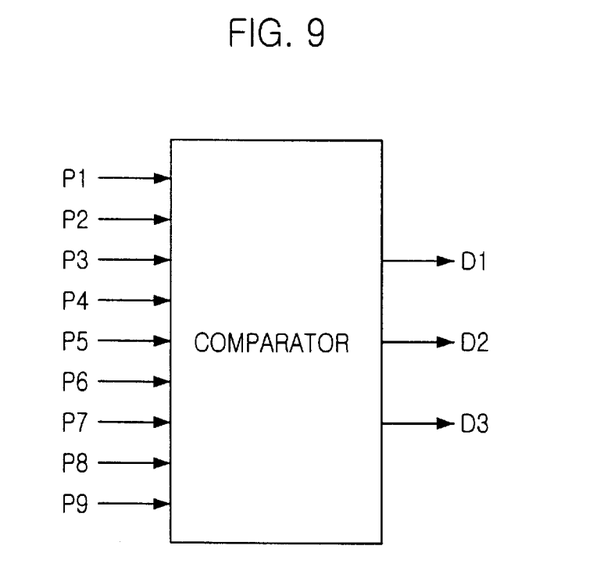
FIG. 9 is a block diagram of a step decision part according to the present invention.

FIG. 9 is a block diagram of the step decision part 704 according to the present invention.

The comparator of the step decision part 704 determines the minimum value among the inputted nine difference values. Also, the comparator determines the minimum value as one location of the center location value of a search block, the middle location value of an edge of the search block and the vertex location value of the search block. That is, the location of the minimum value is determined as a location of the FIG. 2B or 2C of 4SS or a location of FIG. 2d of 4SS. According to the decision, the step of 4SS is determined. The operation algorithm of the search is like as described.

The P1–P9 are inputted from the measurement part 703 to the comparator of the step decision part 704 and D1, D2, D3 are outputted from the comparator.

The D1 indicates the minimum value is the center location value of a search block, the D2 indicates the minimum value is the middle location value of an edge of the search block, and the D3 indicates the minimum value is the vertex location value of the search value. Each minimum value is a reference value for decision of next step.

Figure 10:
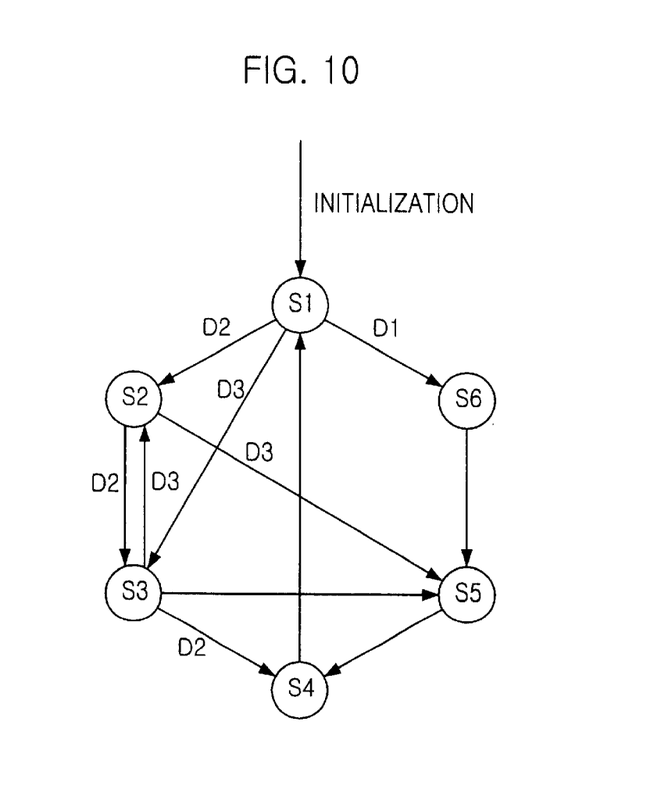
FIG. 10 is a block diagram of a control part according to the present invention.

FIG. 10 is a state transition diagram of the control part 705 according to the present invention.

The 4SS algorithm has an advantage of reducing of a quantity of calculation comparing to the perfect search algorithm, while the algorithm has a poor regularity due to the location difference of 4 step. To solve the problem, the present invention employs the control part 705 implemented state transition diagram.

The state transition diagram according to the present invention has six state values representing the steps of 4SS. All cases inputting to control part 705 have three events. At each case, an irregular cycle is delayed by inserting additional state diagram (S5, S6). As a result, a regular data flow is obtained.

Accordingly, since the present invention has a control part implemented with state transition diagram without additional delay circuit to the processing elements, the area of the control part is reduced and an image processing is performed in real time. Also, the speed is improved.

Although a preferred embodiment of the present invention has been illustrated and described, various alternatives, modifications and equivalents may be used. Therefore, the foregoing description should not be taken as limiting the scope of the present invention, which is defined by the appended claims.

What is claimed is:

1. An apparatus for motion estimation using a search algorithm, said apparatus comprising:
   a first storage part in a single memory for storing a previous image value;
   a second storage part in a single memory for storing a present image value;
   a measurement part for finding an absolute difference between the stored previous image value and the present image value;
   a step decision part for determining a minimum value among output values from the measurement part; and
   a control part implemented by a state transition diagram without adding delay circuits to processing elements representing all steps of the search algorithm for controlling the search algorithm according to a decision of the step decision part.

2. The apparatus in accordance with claim 1, wherein the measurement part includes nine processing elements.

3. The apparatus in accordance with claim 2, wherein each of said nine processing elements of the measurement part finds the absolute difference between the previous image data from the first storage part and the present image data from the second storage part, and outputs the absolute difference to the step decision part, at the same time, each of said nine processing elements outputs the absolute difference to the next processing element to find a partial sum.

4. The apparatus in accordance with claim 2, wherein the step decision part determines a minimum value among the nine difference values from the measurement part, and determine a minimum value as a location value among a center location value of a search block, a middle location value of an edge of the search block and a vertex location value of the search block.

5. The apparatus in accordance with claim 1, wherein the state transition diagram of the control part comprises a plurality of state values representing all states of the search algorithm.

6. The apparatus in accordance with claim 5, wherein the state transition diagram further comprises state values for delaying an irregular cycle of the search algorithms.

7. An apparatus for motion estimation using search algorithm, said apparatus comprising:
   a first storage part in a single memory for storing at least one previous image value, and a second storage part in a single memory for storing at least one present image value;
   a measurement part connected to said first storage part and to said second storage part for finding and outputting an absolute difference between the stored previous image value and the present image value, and said measurement part includes nine processing elements, each of said nine processing elements receives one previous image data from the first storage part and one present image data from the second storage part for processing, said each of said nine processing elements outputs an absolute difference to the step decision part, and, at the same time, said each of said nine processing elements outputs an absolute difference to a next processing element to find a partial sum;
   a step decision part connected to said measurement part for determining a minimum value among said absolute difference from the measurement part; and
   a control part implemented by state transition diagrams without adding delay circuit to processing elements representing all steps of the search algorithm for controlling the search algorithm according to the decision of the step decision part.

8. The apparatus in accordance with claim 7, wherein said control part is connected to the step decision part, the first storage part, and the second storage part.

9. The apparatus in accordance with claim 7, wherein the search algorithm is a four search step algorithm, and each of the processing elements are parallel processing elements.

10. The apparatus in accordance with claim 7, wherein the step decision part determines a minimum value among the nine difference values from the measurement part, and determine the minimum value as a location value among the center location value of a search block, the middle location value of an edge of the search block and the vertex location value of the search block.

11. The apparatus in accordance with claim 7, wherein the state transition diagram of the control part comprises a plurality of state values representing all states of the search algorithm.

12. The apparatus in accordance with claim 11, wherein the state transition diagram further comprises state values for delaying an irregular cycle of the search algorithms.

* * * * *